United States Patent
Munoz et al.

(10) Patent No.: US 9,303,209 B2
(45) Date of Patent: Apr. 5, 2016

(54) CONTINUOUS WAVE DIRECTIONAL EMISSION LIQUID CRYSTAL STRUCTURES AND DEVICES

(71) Applicant: ALPHAMICRON INCORPORATED, Kent, OH (US)

(72) Inventors: Antonio Munoz, Shaker Heights, OH (US); Tamas Kosa, Hudson, OH (US); Paul Luchette, Kent, OH (US); Ludmila Sukhomlinova, Kent, OH (US); Bahman Taheri, Shaker Heights, OH (US)

(73) Assignee: ALPHAMICRON INCORPORATED, Kent, OH (US)

(*) Notice: Subject to any disclaimer, the term of this patent is extended or adjusted under 35 U.S.C. 154(b) by 342 days.

(21) Appl. No.: 13/939,848

(22) Filed: Jul. 11, 2013

(65) Prior Publication Data

US 2014/0016064 A1 Jan. 16, 2014

Related U.S. Application Data

(60) Provisional application No. 61/670,177, filed on Jul. 11, 2012.

(51) Int. Cl.
*C09K 19/54* (2006.01)
*G02F 1/1335* (2006.01)
(Continued)

(52) U.S. Cl.
CPC ............ *C09K 19/542* (2013.01); *G02F 1/1334* (2013.01); *G02F 1/1336* (2013.01);
(Continued)

(58) Field of Classification Search
CPC ............ C09K 19/542; C09K 2019/546; G02F 1/1334; G02F 1/336; G02F 2202/32; H01S 3/1686; H01S 3/08059; H01S 3/213; H05B 33/14
See application file for complete search history.

(56) References Cited

U.S. PATENT DOCUMENTS

| 6,396,859 B1 | 5/2002 | Kopp et al. | 372/39 |
| 6,404,789 B1 * | 6/2002 | Kopp et al. | 372/39 |

(Continued)

FOREIGN PATENT DOCUMENTS

| WO | WO 99/63400 | 12/1999 | ............ G02F 1/1335 |
| WO | WO 2004/053022 A1 | 6/2004 | ............ C09K 19/58 |
| WO | WO 2011/016682 A2 | 2/2011 | ............... H01S 3/06 |

OTHER PUBLICATIONS

Notification of Grant mailed Jul. 14, 2015 in corresponding UK application No. 1312434.2.

(Continued)

*Primary Examiner* — Xinning Niu
(74) *Attorney, Agent, or Firm* — Renner Kenner Greive Bobak Taylor & Weber

(57) ABSTRACT

A light emitting photonic bandgap (PBG) material, and devices uses the same, having (a) a polymer network exhibiting a non-uniform pitch; (b) a small molecule liquid crystal material with a birefringence>0.04; and (c) one or more light emitting dyes having a low triplet state absorption. The light emitting PBG material has a defect-induced density of states enhancing feature at a wavelength that overlaps the emission spectrum of the light emitting dye. Excitation of the light emitting PBG material by a light source causes a directional electromagnetic emission from the light emitting material. The PBG material, and device, are capable of emitting continuous wave laser light as a result of excitation by a low-power incoherent light source.

22 Claims, 6 Drawing Sheets

(51) Int. Cl.
| | |
|---|---|
| *H05B 33/14* | (2006.01) |
| *G02F 1/1334* | (2006.01) |
| *H01S 3/16* | (2006.01) |
| *H01S 3/08* | (2006.01) |
| *H01S 3/094* | (2006.01) |
| *H01S 3/213* | (2006.01) |

(52) U.S. Cl.
CPC .............. *H01S3/1686* (2013.01); *H05B 33/14* (2013.01); *C09K 2019/546* (2013.01); *G02F 2202/32* (2013.01); *H01S 3/08059* (2013.01); *H01S 3/094034* (2013.01); *H01S 3/213* (2013.01)

(56) References Cited

U.S. PATENT DOCUMENTS

| | | | | |
|---|---|---|---|---|
| 7,142,280 | B2 | 11/2006 | Kopp et al. | 349/198 |
| 7,826,510 | B2 * | 11/2010 | Takezoe et al. | 372/51 |
| 2002/0003827 | A1 | 1/2002 | Genack et al. | 372/51 |
| 2010/0021400 | A1 * | 1/2010 | Jay et al. | 424/59 |

OTHER PUBLICATIONS

Response filed Dec. 19, 2014 in corresponding UK application No. 1312434.2.
Office Action mailed Nov. 21, 2014 in corresponding UK application No. 1312434.2.
Response filed Jul. 21, 2014 in corresponding UK application No. 1312434.2.
*Defect Mode Emission of a Dye Doped Cholesteric Polymer Network*; Schmidtke et al.; The American Physical Society; Physical Review Letters; vol. 90, No. 8; pp. 83902-1-083902-4; Feb. 28, 2003.
*Ultraviolet lasing in cholesteric liquid crystals*; Munoz et al.; Optical Society of America; Optics Letters; vol. 26, No. 11; pp. 804-806; Jun. 1, 2001.
*Generation of a tunable radiation by impurity cholesteric liquid crystals*; Il'Chisin et al.; JETP Lett., vol. 32, No. 1; pp. 24-27; Jul. 5, 1980.
*Low-threshold lasing at the edge of a photonic stop band in cholesteric liquid crystals*; Kopp et al.; Optics Letters; vol. 23, No. 21; pp. 1707-1709; Nov. 1, 1998.
*Photon Statistics of Random Lasers With Resonant Feedback*; Cao et al., Physical Review Letters; vol. 86, No. 20; pp. 4524-4527; May 14, 2001.
*Liquid-crystal lasers*; Coles et al.; Nature Photonics; vol. 4; pp. 676-685; Oct. 2010.
*Recent Progress in Chiral Photonic Band-Gap Liquid Crystals for Laser Applications*; Furumi; The Chemical Record; vol. 10; pp. 394-408; 2010—which is sufficiently earlier than the effective US filing date.
*Liquid-crystal photonic applications*; Beeckman et al.; SPIE; vol. 50, pp. 081202-1-081202-17; Aug. 2011.
*Ordered Materials for Organic Electronics and Photonics*; O'Neill et al.; Advanced Materials; vol. 23; pp. 566-584; Nov. 22, 2010.

*Towards highly-efficient liquid crystal microlasers*; Araoka et al.; SPIE vol. 7935; pp. 79350A-1-79350A-7; Feb. 2011.
*Low Threshold Lasing in Cholesteric Liquid Crystals*; Taheri et al.; Molecular Crystals and Liquid Crystals Science and Technology; Section A; Molecular Crystals and Liquid Crystals; 358:1; pp. 73-82; 2001.
*Tunable Mirrorless Lasing in Cholesteric Liquid Crystalline Elastomers*; Finkelmann et al.; Advanced Materials; vol. 3, No. 14; pp. 1069-1072; Jul. 18, 2001.
*Lasing in a three-dimensional photonic crystal of the liquid crystal blue phase II*; Cao et al.; Nature Materials; vol. 1; pp. 111-113; Oct. 2002.
*Triplet-state spectroscopy of the dipyrromethene •$BF_2$ laser dyes*; Montejano et al.; Journal of Photochemistry and Photobiology; A: Chemistry 181; pp. 142-146; 2006—which is sufficiently earlier than the effective US filing date.
*Wide-band reflective polarizers from cholesteric polymer networks with a pitch gradient*; Broer et al.; Letters to Nature; vol. 378; Nov. 30; pp. 467-469; 1995.
*Photoinduced hyper-reflective cholesteric liquid crystals enabled via surface initiated photopolymerization*; McConney et al.; The Royal Society of Chemistry; ChemComm; vol. 47; pp. 505-507; 2011—which is sufficiently earlier than the effective US filing date.
*On the Circular Dichroism and Rotatory Dispersion in Cholesteric Liquid Crystals With a Pitch Gradient*; Mazkedian et al.; Le Journal De Physique (EDP Sciences); vol. 37; pp. 731-736; Jun. 1976.
*Photonic band gab in ID Photonic crystals with gradient profile of pitch and amplitude of modulation*; Sedrakian et al.; Elsevier Optics Communications; vol. 271; pp. 451-456; 2007—which is sufficiently earlier than the effective US filing date.
*Fluoroescense of a dye-doped cholesteric liquid crystal film in the region of the stop band: theory and experiment*; Schmidtke et al.; The European Physical Journal B; vol. 31; pp. 179-194; 2003—which is sufficiently earlier than the effective US filing date.
*Red-Green-Blue 2D Tuneable Liquid Crystal Laser Devices*; Coles et al.; SPIE; vol. 7414; pp. 741402-1-741402-21; Aug. 2009.
*Continuous wave mirrorless lasing in cholesteric liquid crystals with a pitch gradient across the cell gap*; Munoz et al.; Optical Society of America; Optics Letters; vol. 37, No. 14; pp. 2904-2906; Jul. 15, 2012.
*Circularly Polarized Photoluminescence from the Resonance Region of Vitrified Chiral-Nematic Films*; Katsis; Ph.D. Thesis; Materials Science Program, The College School of Engineering and Applied Sciences; University of Rochester, 2000; pp. 1-201.
Search and Exam Report mailed Oct. 30, 2013 in corresponding application No. GB1312434.2.
*Spatial Tuning of Laser Emission in a Dye-Doped Cholesteric Crystal Wedge Cell*; Mi-Yun et al.; Applied Physics Letters; No. 5, vol. 92; pp. 51108-51108-3; Feb. 6, 2008.
*Luminescence Spectrum Thermal Properties of Rhodamine 6G Doped Polymethyl Metacrlate Film Sandwiched Between Cholesteric Liquid Crystal Layers*; Alaverdyan et al.; Journal of Physics, Conference Series; No. 1, vol. 350; ; pp. 12033; Sep. 2011.

* cited by examiner

Uniform Chirp Pitch     Non-Uniform Chirp Pitch

CONTINUOUS WAVE DIRECTIONAL EMISSION LIQUID CRYSTAL STRUCTURES AND DEVICES

CROSS-REFERENCE TO RELATED APPLICATIONS

This application claims priority to, and any other benefit of, U.S. Provisional Patent Application Ser. No. 61/670,177, filed on Jul. 11, 2012, entitled "CONTINUOUS WAVE DIRECTIONAL EMISSION LIQUID CRYSTAL STRUCTURES AND DEVICES," the entire disclosure of which is fully incorporated herein by reference.

BACKGROUND

Low cost lasers which can operate in the continuous wave (CW) mode are of great interest and used in consumer electronics, medical, sensing, telecommunication and other industries. Each application uses particular wavelengths and as such lasers which can provide different emission wavelengths are of particular interest.

Constructing a tunable laser is very difficult for a variety of reasons and is the subject of a significant amount of research in the laser science and technology field. For tunable lasers, typically dye lasers are used. These lasers are based, typically, on fluorescent dyes dissolved in an active medium. The system is then placed in an external cavity and optically pumped with a light source to achieve lasing. The emission energy from a dye laser can be significantly enhanced by using a secondary amplifier. Amplifiers are systems or media made of materials similar to the laser material, and are also optically pumped similar to the laser material but are not within a cavity. As such, their main purpose is to amplify a pre-existing laser emission. Clearly, for efficient operation, the emission of the laser from the cavity must match the gain spectrum of the amplifiers. These systems have been extensively studied and used in a variety of fields ranging from spectroscopy to medicine.

A drawback of dye lasers is the initial alignment of the cavity. Since dye lasers provide a broadband emission, it is difficult to obtain a single laser wavelength and avoid artifacts such as mode hopping. To achieve single wavelength operation, the laser cavities are typically complicated systems with several optical elements, such as a grating or etalons, designed to allow the user to isolate the laser emission. This drives up the cost and makes the laser bulky. More importantly, this means that the operator must become very familiar with the system and tune it for different wavelengths. This has made these systems not applicable in industries where the operator is not a laser scientist or engineer.

To avoid this issue, fixed wavelength diode lasers are used. In this case, a compact laser system can be created out of semiconductor lasers. The cavity is built upon the semiconductor directly by processes such as vacuum deposition. Diode lasers operate by applying a voltage across the material and are typically electrically pumped. Diode lasers have the drawback that they can only be operated at select, predetermined wavelengths and are not used in conjunction with amplifiers. This has limited their use to low power applications. To alter the wavelength, the complete laser system has to be changed which is a significant drawback for several applications. Despite these shortcomings, they remain the cornerstone of many consumer electronics.

Distributed feedback diode lasers were designed to overcome this problem. In these systems, the material itself acts as a cavity with a wavelength selectivity built in. In such a case, low threshold lasing can occur at the select wavelengths. However, these systems are expensive to fabricate and remain single wavelength with limited capability for true amplification.

Cholesteric liquid crystals offer the ability to create a distributed feedback system intrinsically by creating a helical structure that acts as a polarization dependent Bragg reflector and a distinct laser cavity. In these systems, incident light with wavelength and handedness matching that of the structure cholesteric liquid crystal is reflected. Cholesteric liquid crystals (CLC) which exhibit this behavior are referred to as Photonic Band Gap (PBG) materials. Analogous to semiconductors, the reflection properties can be altered if there is a "defect" in the structure. In dye doped PBG systems, it is possible to get directional emission and lasing without the need for conventional external laser cavity. Lasers made from this concept are referred to as distributed feedback lasers or as photonic band gap lasers. The efficiency of these lasers depends on a number of parameters including the dye, chirality of the host and the birefringence of the liquid crystal. A parameter of the system that is used to characterize the efficiency of the PBG is the "density of the states" at a particular wavelength. A larger density of the states results in a lower threshold in lasing in the materials. In CLC based PBG, this jump in the density of the states occurs at the edge of the reflection band, consequently lasing is typically observed at those locations.

Several efforts have targeted the optimization of photonic band gap materials to reduce the threshold for observation of lasing (see Genack et. al., US APPL. 2002/0003827, and Kopp et al. U.S. Pat. No. 7,142,280). Local changes in the density of states have been suggested as means of reducing the threshold with some success (see L. M. Blinov and R. Bartolino Ed. "*Liquid Crystal Microlasers*". Transworld Research Network, Kerala, 2010). These approaches mimic those that have been used for diode lasers based on semiconductors. However, in the case of CLC-based PBG, the intrinsic nature of the material, coupled with use of dyes allows for low cost, large area lasing. In addition, since the active medium is a dye, both wavelength tunability and amplification are possible. These properties can help overcome many of the issues associated with the diode laser. As such, the concept of using cholesterics as a laser cavity has become subject of great research in the academic world. A review of these research efforts is provided in, for example, H. Coles and S. Morris, "Liquid-crystal lasers", *Nature Photonics* 4, 676-685 (2010); and in Furumi S. "*Recent Progress in Chiral Photonic Band-Gap Liquid Crystals for Laser Applications*" The Chemical Record 10, 394 (2010).

Dye-doped cholesteric liquid crystal (CLC) lasing has been observed in monomeric, oligomeric, polymeric CLCs, elastomers and even blue phases of liquid crystals. Lasing in circularly polarized mode matching the chirality of a CLC helix occurs at a band-edge of a CLC spectral reflectivity profile. However, to date, all CLC laser observations have been based on pulsed excitations by nanosecond or picosecond laser sources. Tunable, continuous wave (CW) CLC lasers are greatly desired but, despite many efforts they have not been realized. For example, Coles and S. Morris conclude their review of the field by stating that "The ultimate aim is to achieve pumping using low-power incoherent optical excitation. At present, pumping is restricted to high-intensity optical pulses of short duration", therefore "the threshold for lasing must be further reduced before a low-power incoherent light source can be used. We must not understate the prospect of an all-organic device that is compact (millimetre thickness), wavelength-tunable and quasi-continuous-wave. This Review has highlighted the significant steps that have already been taken towards this goal, but these properties have yet to be demonstrated simultaneously in a single device." (H. Coles and S. Morris "Liquid-crystal lasers", *Nature Photonics* 4, at 685).

BRIEF DESCRIPTION OF THE DRAWINGS

FIG. 4(*b*) is a graph diagram showing the linewidth and amplitude of RH laser emission as a function of CW pump power. The laser emission occurs at the exact same location as nanosecond lasing, at the local minimum within the selective reflection band of the CLC structure (region 1)

SUMMARY OF THE INVENTION

Figure 1A:
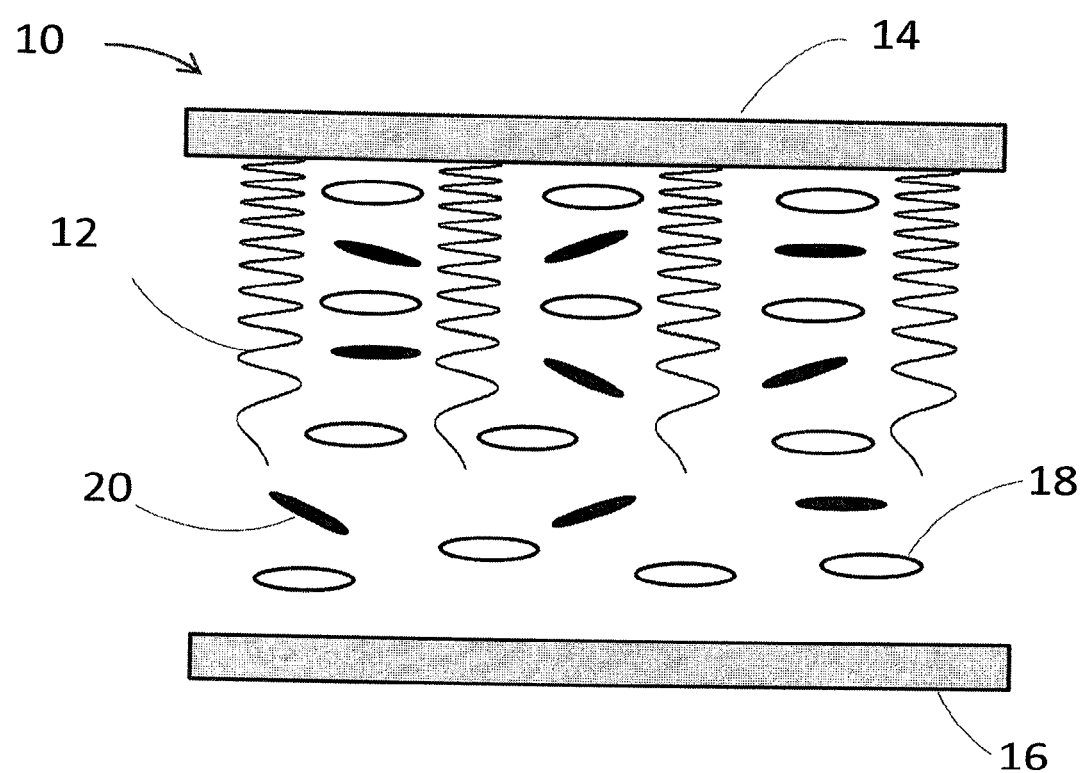
FIG. 1A is a schematic representation of the light emitting CLC-PBG material of the present invention.

The inventors are the first to describe a new host approach for CLC lasers, and the first to report the observation of pulsed and continuous wave (CW) directional emission in dye doped cholesteric liquid crystals (CLCs) under both coherent (laser) and incoherent (e.g. LED) continuous wave (CW) light excitation. See Munoz et al. "Continuous wave mirrorless lasing in cholesteric liquid crystals with a pitch gradient across the cell gap", *Optics Letters,* 2012 Jul. 15; 37(14):2904-6. The combination of the light emitting (e.g. fluorescence) dye and a polymer stabilized distributed feedback structure of the CLC that exhibits defect-type photonic band gap (PBG) behavior is used to achieve this effect.

Accordingly, provided herein is a light emitting PBG material, comprising (a) a polymer network exhibiting a non-uniform pitch; (b) a small molecule liquid crystal material with a birefringence >0.04; and (c) one or more light emitting dyes having a low triplet state absorption; wherein the light emitting PBG material has a defect-induced density of states enhancing feature at a wavelength that overlaps the emission spectrum of the light emitting dye.

The light emitting material is designed so that excitation by a light source causes a directional electromagnetic emission from the material.

The light source can be selected from: a laser, a flash lamp, focused sunlight, a light-emitting diode (LED), an electrically pumped electroluminescent material embedded within the one or more light emitting material, and a continuous wave (CW) light source.

In some embodiments, the non-uniform pitch of the polymer network may include a uniform chirp, a non-uniform chirp, or a combination thereof. In some examples, the polymeric network includes one or more mesogenic monomers. In some examples, the polymeric network includes a chiral component.

The small molecule LC material can be chosen from a chiral nematic liquid crystal, a nematic liquid crystal or a smectic liquid crystal. In some examples, the birefringence of the small molecule LC is equal to or above 0.04, 0.08, 0.12, 0.16, 0.20, 0.25, or 0.28.

The light emitting material includes one or more light emitting dyes that can be selected from: rare earth doped materials, semiconductor materials, organic light-emitting materials, conjugated polymers, dye-doped materials, materials containing color centers and fluorescent dyes. In a preferred embodiment, the light emitting dye is a fluorescent dye.

In some embodiments, the light emitting dye emits light in the visible region of the spectrum.

In some embodiments, the directional electromagnetic emission form the light emitting material is a laser light. In some examples, the directional electromagnetic emission form the light emitting material is a continuous wave laser light.

In some embodiments, the wavelength of the directional electromagnetic emission can be altered by one of the following: changing a temperature of the PBG material; applying mechanical stress; applying a uniform or non-uniform electric field; photo-optic tuning of the PBG material; or photo-optic tuning of one or more substrates containing the PBG material.

Also contemplated herein are light emitting devices, comprising: a light emitting PBG material as described herein, and a light source, arranged so that excitation from a light source causes directional emission from the device.

DETAILED DESCRIPTION

Definitions

For the purposes of this patent, terminologies are used as defined in L. M. Blinov and R. Bartolino Ed. "*Liquid Crystal Microlasers*". Transworld Research Network, Kerala, 2010) or other references cited herein unless specifically defined otherwise.

"Directional emission" refers to emission wherein the energy emitted is not equal in all directions.

The term "PBG" material, as used herein, refers to a cholesteric liquid crystal photonic band gap (CLC-PBG) material. The CLC-PBG materials that can be used include materials that are similar to those defined in the literature, such as, for example, those materials described in the following references: Muñoz A, Palffy-Muhoray P and Taheri B., "Ultraviolet lasing in cholesteric liquid crystals" *Opt Lett* 26, 804 (2001); Taheri B, Muñoz A, Palffy-Muhoray P and Twieg R. "Low threshold lasing in cholesteric liquid crystals" *Mol Cryst Liq Cryst* 358, 73 (2001); Finkelmann H, Kim ST, Muñoz A, Palffy-Muhoray P and Taheri B. "Tunable mirrorless lasing in cholesteric liquid crystalline elastomer". *Adv Mat* 13, 1069 (2001); Cao W, Muñoz A, Palffy-Muhoray P and Taheri B. "Lasing in three dimensional photonic crystal of the liquid crystal blue phase II". *Nature Materials* 1, 111 (2002); "*Liquid Crystal Microlasers*", L. M. Blinov and. Bartolino ed., Transworld Research Network, Kerala, (2010);

Coles and Morris, *Nature Photon.* 4, 676-685 (2010); Il'chishin, et al., *JETP Lett* 32, 24 (1980); Kopp et al., *Opt Lett* 23, 1707 (1998); Furumi, *Chem. Rec.* 10, 394 (2010); Beeckman et al., *Opt. Eng.* 50, 081202 (2011); O'Neill and Kelly, *Advanced Materials* 23, 566(2011); and Araoka and Takesoe, *SPIE The International Society of Optical Engineering proceedings* 7935, 79350(2011).

"Light emitting dyes" refer to any electrically or optically excitable material or dye that emits photons. Examples include: rare earth doped materials, chelated rare earth doped materials, semiconductor materials, organic light-emitting materials, conjugated polymers, dye-doped materials, materials containing color centers and fluorescent dyes.

Although the following terms are understood in the art, we provide a brief description below. "Chiral" materials are not symmetrical on a molecular level—that is molecules of chiral materials are not identical to their mirror images. Cholesteric materials, such as cholesteric liquid crystals ("CLCs"), spontaneously form a macroscopic helical structure when either the liquid-crystal molecules are inherently chiral or when chirality is introduced. These materials can be described as having multiple molecular layers where molecules in the different layers are oriented on average at a slight angle relative to molecules in other layers. Molecules in consecutive layers are rotated slightly relative to those in the preceding layer. Thus, the average direction of the molecules, known as a "director", rotates helically throughout the cholesteric material. The presence of chirality causes the director profile to assume a twisted configuration throughout the medium. In reality, there is no layered structure and the local 'nanoscopic' ordering is identical to that of the nematic phase. The defining length scale of this phase is the pitch.

A pitch of a cholesteric material is defined as a thickness (or length) of the material in which the director rotates a full 360 degrees. Cholesteric structures also have a property called "handedness"—they may be right-handed or left-handed depending on the direction of rotation of the molecules from layer to layer. The handedness of a cholesteric structure determines the circular polarization and amplitude of light passing through the structure.

The anisotropic nature of the CLC molecules, combined with the continually rotating director, results in a photonic bandgap (PBG) when the wavelength of light is comparable to the optical pitch of the helix. CLCs have a particular reflection band (associated with the "photonic bandgap" of PBG) which is a result of its periodic structure—a range of wavelengths in which the transmission of light through the structure is small as a result of multiple coherent reflections within the structure. At the edge of the photonic stop band gap there are a series of narrow photonic states (or modes) at the peak of which the transmission of light reaches unity. The spectral width of these states is proportional to the inverse of the dwell time for the photons within the CLC medium. The long dwell time of photons in spectrally narrow states facilitates lasing at the frequency of these modes in activated materials since emitted photons are given greater opportunity to stimulate emission before they emerge from the CLC medium. Since the photon lifetime is longest for the state closest to the photonic stop band edge and falls rapidly with state number from the edge, lasing occurs in the wavelength corresponding to the first state or corresponding to a few states closest to the photonic stop band edge. This phenomenon is described in, for example, U.S. Pat. No. 6,404,789 (Kopp et al.).

When a "defect", such as spacing or an additional layer of a foreign substance is introduced into a CLC structure, then an additional localized photonic state or number of photonic states may be introduced into the photonic stop band. Maximum efficiency lasing occurs at the frequency of the localized state. Prior examples of such a localized state in the center of the photonic stop band are shown in U.S. Pat. No. 6,396,859 (Kopp et al.).

However, to date, all PBG based CLC laser observations have been based on pulsed excitations by nanosecond or picosecond laser sources. Tunable, continuous wave (CW) CLC lasers are greatly desired but, despite many efforts they have not been observed. There are several reasons for this, which are thought to be material and geometry parameter dependent. We believe the reasons could include the following: (1) dyes and doped CLCs are unable to withstand the continuous high fluence levels; (2) in general a dye's triplet state population prevents CW-lasing by reducing the photon-to-photon conversion efficiency; and/or (3) cholesteric materials do not have the stability to provide cavity needs. Therefore, despite numerous efforts, prior attempts at obtaining continuous wave (CW) lasing in dye doped cholesteric liquid crystals had not been successful.

The inventors have found that under the right material and cavity configurations, it is possible to overcome the issues presented above and achieve the much elusive CW lasing. To achieve directional emission the following elements are needed: (1) a CLC material with a photonic band gap property (PBG material) containing (2) a light emitting dye that has a low triplet state quantum yield, (3) a polymer matrix which can enhance thermal stability of the PBG material, and (4) a density of states enhancing feature within the PBG material at a wavelength that overlaps the emission spectrum of the light emitting dye.

The density of states increasing structural feature can be implemented by inducing a defect-like structure in the photonic band gap material. In our case, the defect is produced by the non-uniform pitch of the CLC polymer network.

Figure 1B:
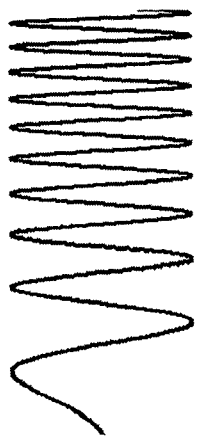
FIG. 1B is a schematic representation of examples of different non-uniform pitch geometries of the CLC polymer.
Figure 1B:
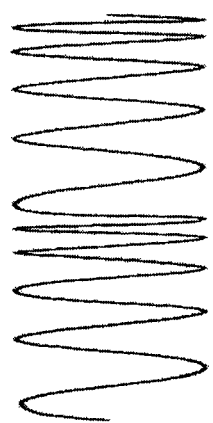

The polymer network has one or more non-uniform pitch variations, as shown in FIG. 1B, resulting in a structural "defect". This defect manifests itself by changing the transmission properties of the CLC and corresponding density of states of the cavity, enabling directional emission and lasing. The polymer network must either have chirality of its own or must follow the chirality of an added liquid crystal material. It should be noted that the structure can be composed of polymeric liquid crystal or a small molecule liquid crystal in conjunction with a polymeric material.

The polymer network may be prepared in situ in the cell or may prepared outside the cell, and then loaded into the cell. When prepared in situ, common photo-polymerizable monomers such as acrylates, methacrylates may be used, and the polymerization process may be initiated from a surface or from the bulk. The polymer network's photo-polymerizable monomeric components may include mesogenic and non-mesogenic monomers, chiral components, cross linkers, gain materials such as dyes. and reactive anchors to graft the polymer to a specific surface. Alternatively, the polymer network may be prepared in advanced, and grafted to one or both substrates in the cell. When the polymer network is prepared in advance, it may be prepared as a random linear or branched polymer, or as a block polymer, including AB, ABA, or other variations. For polymer network is prepared in advance, polymers other than photo-polymerizable polymers may be used, such as siloxanes. A block copolymer may contain multiple blocks, each having its own unique pitch, cross-linker density, mesogenic units, or gain materials. The polymer network may or may not contain a chiral component to achieve a specific pitch or chirp. When polymer networks are attached on opposing substrates, two polymer networks may be of the same pitch, or of a different pitch. Additionally, when polymer networks are on opposing substrates, there may be a physical gap between the opposing polymer networks filled with liquid crystalline material. Moreover, for polymer network on opposing substrates, the chirality of both may be the same or of a different handedness.

Light emitting or laser dyes are known in the art and can be selected from any number of materials, for example those sold by Exciton. Preferably, they should have low triplet state absorption or quantum yield as outlined in H A Montejano, et al. "Triplet state spectroscopy of dipyrromethane-BF2 laser dyes". *J of Photochem and Photobiol A* 181, 142 (2006). The light emitting dyes can also exhibit dichroism in their emission characteristics. Light emitting dyes can be selected from: rare earth doped materials, semiconductor materials, organic light-emitting materials, conjugated polymers, dye-doped materials, materials containing color centers and/or fluorescent dyes. Preferably, light emitting dyes are fluorescent dyes.

Referring now to FIG. 1A, a schematic diagram of an example of a light emitting material 10 according to the invention is shown. (The diagram is not to scale). The material 10 includes a CLC polymeric network 12. To produce the pitch gradient in the material, a method of surface-initiated polymer stabilization of the CLC was used that concentrates the polymer network more towards one side (surface 14) of the cell rather than the bulk. The material 10 also includes small molecule liquid crystals (LC) 18 and light emitting dyes 20. The small molecule LC 18 can either be nematic, smectic or cholesteric. But in any case, the small molecule LC 18 will have a chiral geometry dictated by the chiral polymeric network 12.

FIG. 1B shows examples of different non-uniform pitch geometries of the CLC polymer. These include: a uniform chirp, where the pitch of the helix gradually increases or decreases; or a non-uniform chirp, where the pitch of the helix gradually changes but can increase and then decrease, or vice versa, in a non-uniform manner. It should be noted that the non-uniform pitch of the polymeric network described herein is distinct from a discrete localized pitch variation, which is produced when two or more layers of cholesteric liquid crystals, with different pitches, are adjacent each other.

Figure 2A:
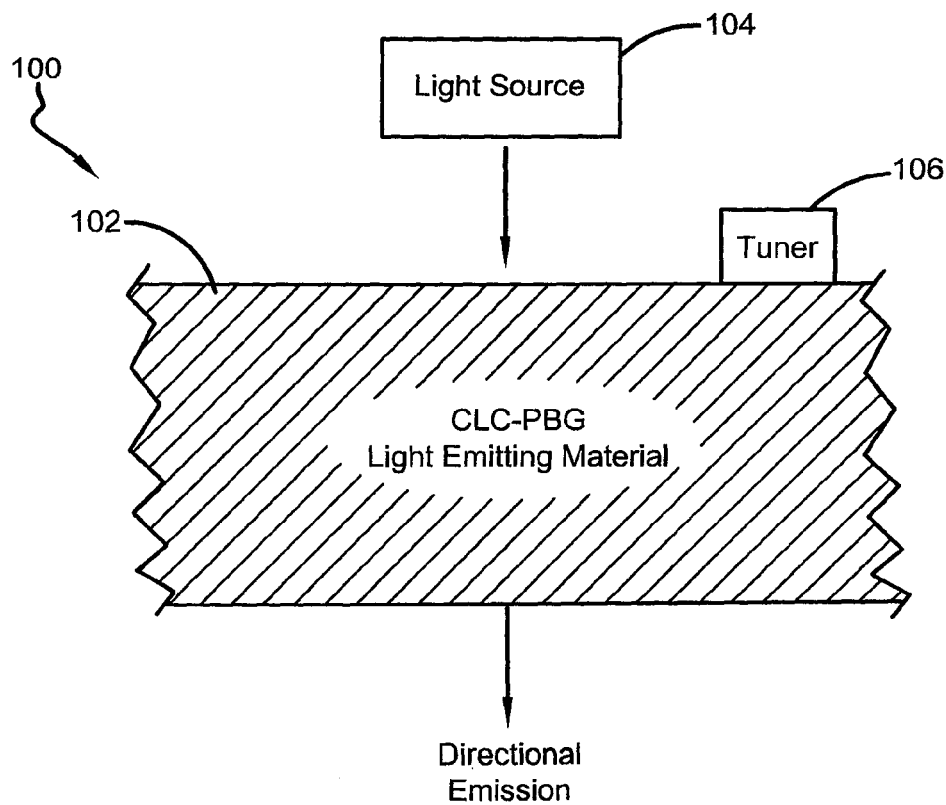
FIG. 2A is a schematic diagram of a light emitting device using the light emitting PBG material of the present invention.

FIG. 2A shows a schematic example of a light emitting device using the light emitting material according to the invention. Accordingly, the device 100 includes a dye-doped CLC-PBG light emitting material 102 and a light source 104. The light emitting PBG material 102 has a defect-induced density of states enhancing feature (FIG. 2B, 210) at a wavelength that overlaps the emission spectrum (204) of the light emitting dye.

Figure 2B:
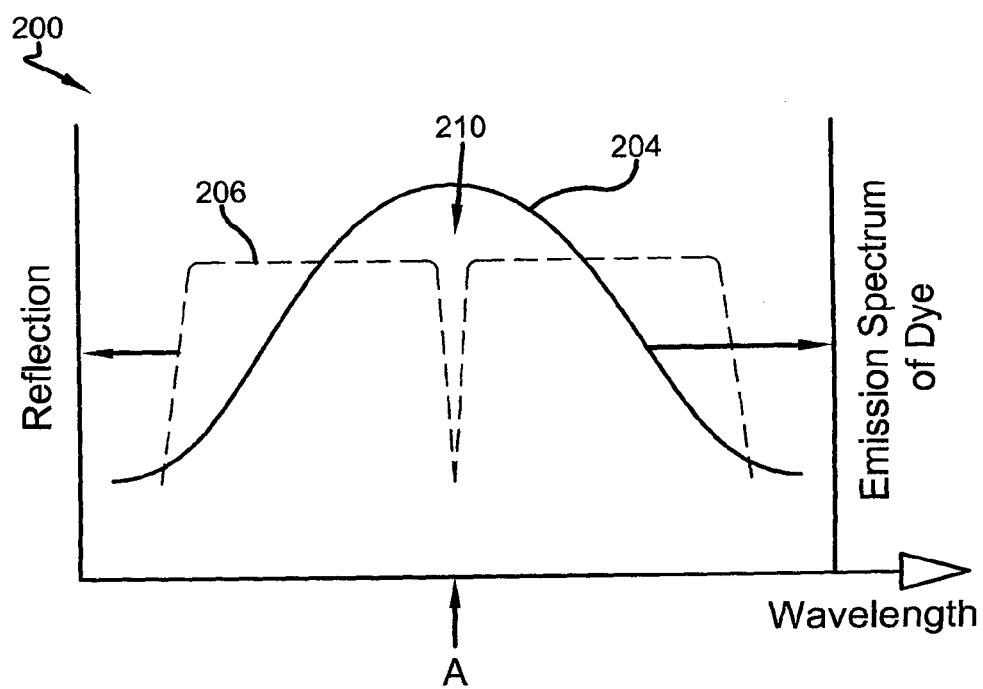
FIG. 2B is an example of a graph diagram of an emission spectrum of the light emitting dye in relation to the reflection spectrum of the PBG material, both plotted against wavelength.

FIG. 2B is a graph diagram showing an example of the emission spectrum (204) of the light emitting dye in relation to incident light reflection (206), (both plotted against wavelength), showing the defect-induced density of states enhancing feature 210, at which wavelength directional emission is observed.

Also contemplated herein are CLC-PBG materials with two or more density of states enhancing features (or defects), which can produce lasing at different wavelengths, either at different times, or simultaneously. Another variation of the CLC-PBG material includes the provision of two or more light emitting dyes, which can be selectively activated to produce lasing at different wavelengths, either at different times, or simultaneously.

Tuning

The wavelength of liquid-crystal lasers can be tuned using a variety of different external stimuli, and it is this sensitivity that makes them particularly attractive as laser sources. External stimuli that have been used for wavelength tuning include temperature, ultraviolet illumination, mechanical stress, spatial variation and electric field.

Thermally induced changes in the helical pitch can be used to vary the emission wavelength of the liquid-crystal laser. An increase in helical pitch causes the wavelength to red-shift, whereas a decrease causes a blue-shift. In some example, the laser wavelength varies in a stepwise manner because pitch changes in a chiral nematic liquid crystal are discrete with temperature for thin films.

Another method involves spatial tuning and typically involves forming a pitch gradient, together with a variety of dyes, to cover a wide proportion of the visible spectrum. Wavelength tuning can be achieved by varying the position of the cell relative to the pump beam. For example, wideband emission has been demonstrated using a sample containing a number of different dyes and a pitch gradient. Some of the dyes acted as Forster transfer elements by decoupling excitation and emission processes. Spatial tuning can also be achieved in photopolymerized chiral nematic PBG, in which the pitch gradient has been 'frozen-in' due to the formation of the polymer network. Polymerization of the structure ensures that the same area of the sample produces the same laser emission wavelength.

In some example, more than one dye is required for spatial tuning, and indeed many other forms of tuning that cover a broad wavelength range. To excite all the dyes at a single fixed wavelength Forster transfer can be used even if the absorption bands of the dyes do not overlap.

Photochromic tuning can be achieved by, for example, dispersing photoactive agents into the liquid-crystal matrix, making it possible to adjust the periodicity of the chiral structure by irradiating the sample with ultraviolet light. For example, wideband wavelength tuning (e.g. 610-700 nm) can be achieved by adjusting the exposure energy of the ultraviolet light source. Phototunability can also be achieved by varying exposure time instead of exposure energy. Other examples include increasing the tuning range by using two different dyes, e.g. DCM and PM580, dissolved in a liquid crystal host. Reversibility can be achieved using photochromic compounds such as sugar derivatives with plural azobenzene substituents, in which the trans-cis and cis-trans conformation changes can be induced using ultraviolet and visible light, respectively. Reversible tuning can also be achieved through photoisomerization of novel chiral azo dyes.

Other examples include optical tuning of defect-mode lasers through a cis-trans conformation change, resulting in a contraction of the pitch in the defect layer.

Electric-field tuning can be achieved using the response of liquid crystals to an electric field or by creating attractive effects on the substrates. For bandedge lasers, different geometries and coupling mechanisms have been used to alter the pitch of the structure. The pitch can either be unwound, or contracted, using chiral nematics. Other examples include adjusting the effective refractive index of the layer by reorienting the nematic director in the defect.

EXAMPLE

One example of a device according to the invention is described in this non-limiting example. In this example, we show the results of a new approach for achieving CLC directional emission using a material with a non-uniform reflection band across the cell thickness.

We selected a dye with both low absorption and low quantum yield in a triplet state such as outlined in Montejano, et al, *J. Photochem. Photobiol. A*. 181, 142 (2006). Polymer network was added to the system to allow for stability of the structure. This combination permitted us to achieve CW-CLC lasing.

There are several art recognized approaches to produce a non-uniform reflection band. Here, we used the non-limiting approach of a pitch gradient (see SEM images of CLC structures prepared by similar methods, such as those referenced in Broer, et al., "Wide-band reflective polarizers from cholesteric polymer networks with a pitch gradient", Nature 378, 467-469 (1995)]; D. Katsis, "Circularly polarized photoluminescence from the resonance region of vitrified chiral-nematic films", Ph.D. Thesis, University of Rochester, (2000) (available at http://www.lle.rochester.edu/media/publications/documents/theses/Katsis.pdf). While other techniques can be used, we utilized this method since it provided the potential for lower cost solutions.

In this non limiting method, we used surface-initiated polymer stabilization of CLC materials that concentrates the polymer network more towards one side of the cell rather than the bulk, as described in, for example, McConney, et al., Chem. Commun. 47, 505 (2011)—by placing the photoinitiator in the alignment polyimide layer of one of the cell substrates (see details in McConney, et al., Chem. Commun. 47, 505 (2011) with Suppl. Mater.). A planarly-aligned LC cell was fabricated using polyimide coated substrates rubbed antiparallel. A 30-µm thick cell was filled with a right-handed (RH) CLC mixture containing a non limiting example of RH chiral monomer RM691 (Merck), a non limiting example of RH chiral dopant R811 (Merck), a non limiting example of achiral diacrylate monomer RM257 (Merck), and a non limiting example of achiral nematic E7 (Merck) [16]. The thickness of the active region of the cell can be any value between 3 micron and 150 micron including 5, 10, 15, 20, 50, 75, 100, 125, 150 microns, or any value in between.

The cells were exposed to UV-light to photoinitiate the polymerization. After polymerization, the LC mixture and unpolymerized monomer was leeched from the cell by immersing in cyclohexane for several days followed by vacuum oven drying. The cell was subsequently back filled with a mixture of the nematic LC E7 doped with Pyrromethene dye PM597 (Exciton). This non limiting choice of dye and liquid crystal satisfies the requirement for low absorption of the triplet state. It should be noted that different laser dyes can be used to allow emission across one or more wavelengths in the visible, ultraviolet or infrared region of the spectrum.

The E7/PM597 mixture swells the dry polymer network template to reform the 1-D photonic bandgap. The crosslinked polymer network composed from RM691 and RM257 induces a rigid CLC structure that has only small dependence on temperature. This structural CLC is robust (i.e. exhibits better resistance to degradation, mechanical stress, etc.) and more temperature independent. It is important to note that the backfilled nematic LC E7 is thermotropic and its refractive index depends on the temperature. Also, it should be noted that instead of achiral E7, a chiral nematic mixture can be used.

Figure 3:
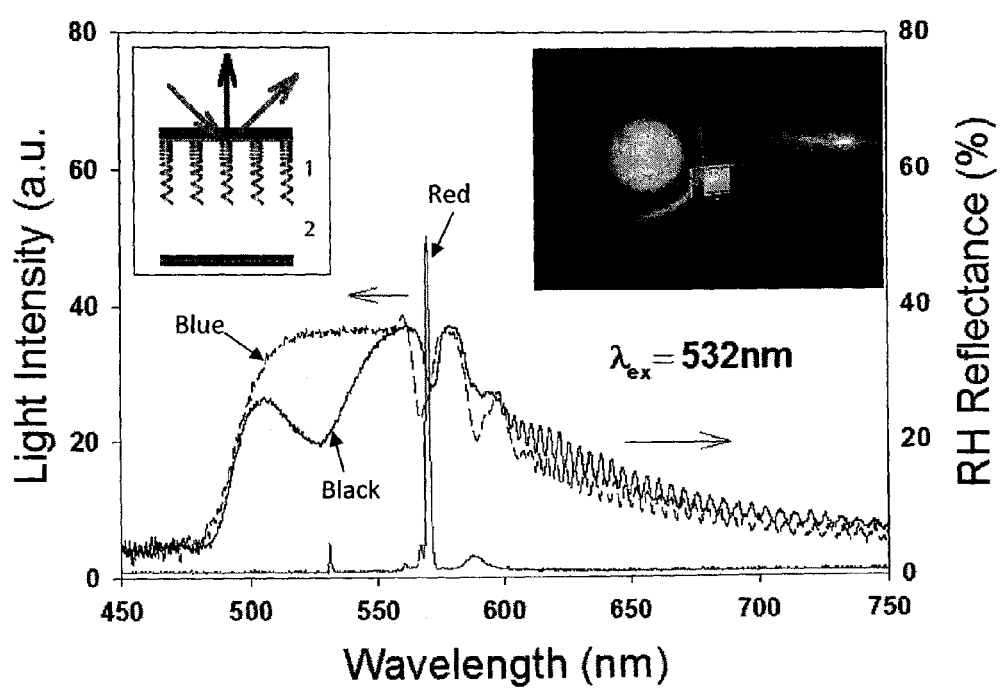
FIG. 3 is a schematic diagram of the structure of the light emitting PBG material (inset, left) and shows the spectral reflectivity profiles of the LC cell in the example (region 1 of template structure) with (black) and without the PM 597 dye (blue) along with observed nanosecond laser emission spectra (red). A corresponding picture of the laser emission is shown in the right insert.

FIG. 3 (left insert) shows the structure of the rigid, crosslinked polymer template CLC system with a pitch gradient across the cell thickness. Using anisotropic surface polymerization (one side only) and solvent exchange, a helical polymer structure was produced that is tethered to only one of the substrates and occupies about ⅔ of the cell gap. As such, the LC cell possesses two regions (1 and 2) with different optical properties. Region 1 has characteristics very similar to conventional CLCs, whereas region 2 resembles a nematic LC based system.

The spectral reflection band from the prepared cell (from region 1) with (black) and without PM597 dye (blue) is shown in FIG. 3. In the cell prepared with PM597 (black curve), a minimum is apparent near 525 nm as a result of dye absorption. Both reflectivity curves of the CLC structure deviates from the expected reflectivity curves of CLC with a uniform pitch. Additional minima and large lobes appear in the area within or close to a reflectivity stopband at a long-wavelength side of spectrum. It is well known both from the theory and experiments that additional minima and lobes, similar to FIG. 3, may appear within a stop-band region in a CLC with a linear pitch gradient across the cell thickness. Any nonuniformity in the pitch gradient or a defect layer can further contribute to this effect.

The reflection band of the structure is slightly offset from the maximum (587 nm) of the wide-band PM597 dye fluorescence in order to demonstrate that lasing can occur even if the reflection band edge does not coincide with the maximum of the dye emission.

We initially used nanosecond pumping. For this, a laser Opotek model Opolette 355 II-UV was used to excite the samples at 532 nm which is a region wherein the dye absorbs light. It should be noted that the wavelength used is non-limiting and any wavelength which coincides with the absorption of the fluorescent dye can be used. The repetition rate and the pulse length were 1 Hz and 6 ns. A lens (f=20 cm) was used to focus the pump beam to a spot of ~300 µm diameter at the sample. The pump beam was incident at ~10° from normal. For spectral measurements an Ocean Optics HR2000 spectrometer was used (1 nm spectral resolution), whereas emission energy measurements were made using an energy meter (Molectron 2000).

For the CW portion of the experiments, Power Technology model LDCU5 diode pumped CW Nd:YAG laser at 532 nm or a green Luxeon 1 W LED fitted with a focusing lens (f=2 cm) were used as pump sources.

Nanosecond lasing was observed at 572 nm with a linewidth of ~1 nm coinciding with the minimum within a reflectivity stopband (away from the peak emission of the dye). A threshold of 25 nJ/pulse, was observed. This is significantly lower than our results with dye doped CLC material without polymer network (CLC BLO61 doped with 2 wt % DCM dye, 15 µm cell gap), but consistent with those reported in the literature for PM597 dye.

For the CW experiments, a CW laser operating at 532 nm with an actual linewidth of 0.5 nm was used under the same experimental conditions. A directional, predominantly to within 30° from normal, emission at the same location 572 nm was observed at a local minimum within a stopband with a FWHM of ~3 times that of the 532 nm pump as measured on the same system or ~1.7 nm. It should be noted that broader line widths of 5 nm, 10 nm, and 15 nm can be achieved also. This emission was accompanied by the fluorescence band of the dye. The emission demonstrates polarization dependence. The directional emission shown (FIG. 4) is right-handed (RH) and is not present in the left handed (LH) emission spectrum. The relative contribution of background fluorescence is higher in CW compared to nanosecond pumping. In addition to the emission at 572 nm, a secondary emission was also observed at 587 nm (second local minimum in a reflectivity profile) under both pumping regimes. Therefore, a single system can demonstrate directional emission in multiple wavelengths simultaneously.

Figure 4:
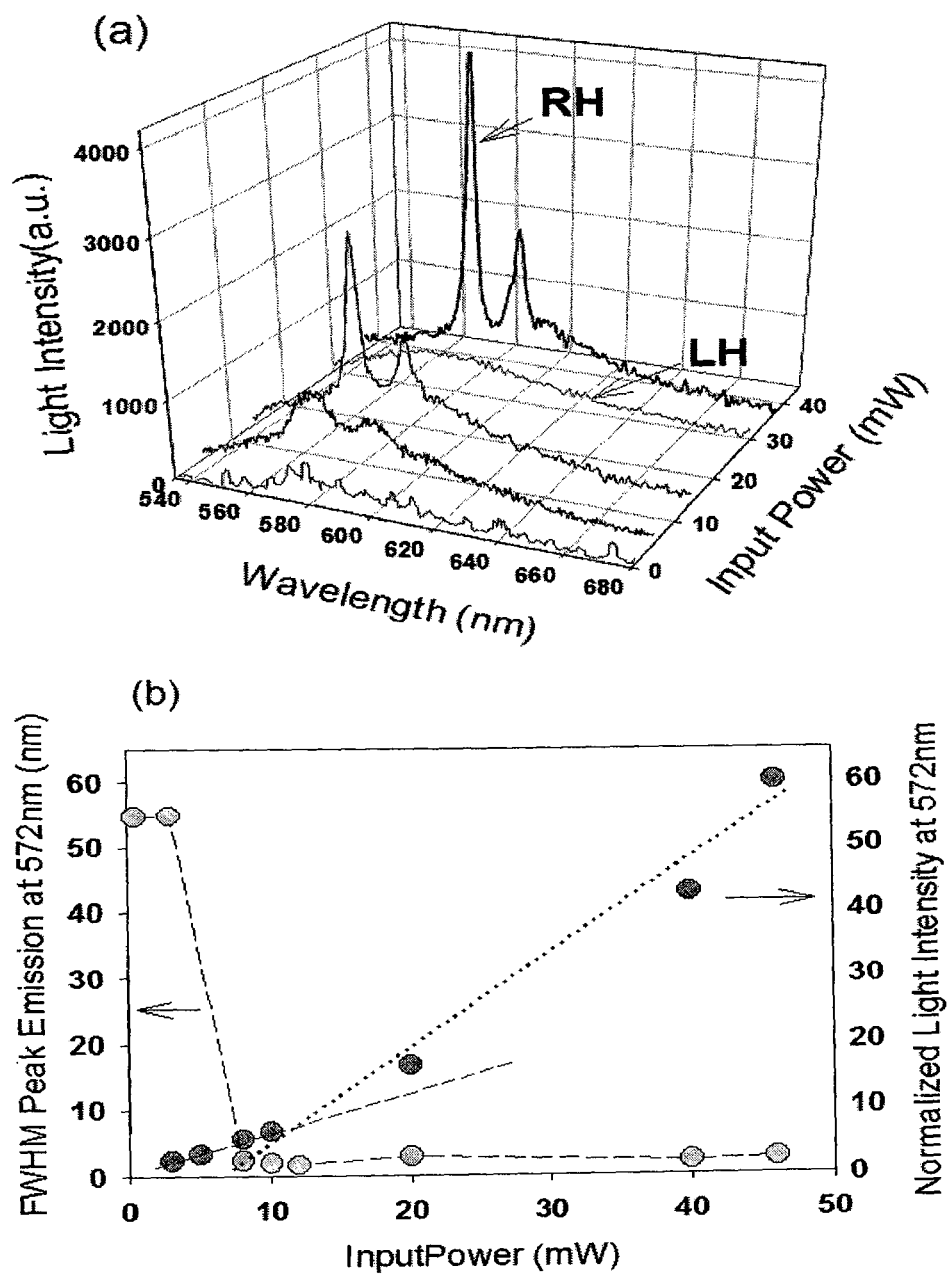
FIG. 4(*a*) is a graph diagram showing emission of the sample at different CW pumping powers. Red line is the RH and pink is the LH emission spectra.

The intensity dependence of the CW 572 nm emission line was investigated and shown in FIG. 4. It can be seen that the emission linewidth and amplitude demonstrate a distinct nonlinear behavior with pump intensity above the threshold of ~3

W/cm2. Due to CW pumping, the results include the typical emission of the dye and as such exhibit a linear and a nonlinear component in their pump intensity results. However, the relative ratio between the two is shown to be highly pump power dependent. The laser-like emission was directional to <10° emission angle and lasted during the entire data collection process >5 sec.

To summarize the CW-laser pumped observations, we observed a (i) directional, (ii) narrow bandwidth emission, with a (iii) nonlinear response (amplitude and bandwidth) to the pump light at (iv) the exact location (572 nm) of a local minimum region that nanosecond lasing was observed, with (v) the same polarization/mode dependence of a CLC cavity that houses the emission. This, to our knowledge, is the first such observation of CLC lasing under CW-excitation.

In both cases, under pulsed and CW laser excitation of our samples at 532 nm, a secondary laser like emission is also present at approximately 587 nm which is the fluorescence maximum of PM597 dye in our host and a position of another local minimum in reflectivity profile. A dramatic spectral narrowing also occurs above a pump threshold. The exact nature of this emission is under study.

Figure 5:
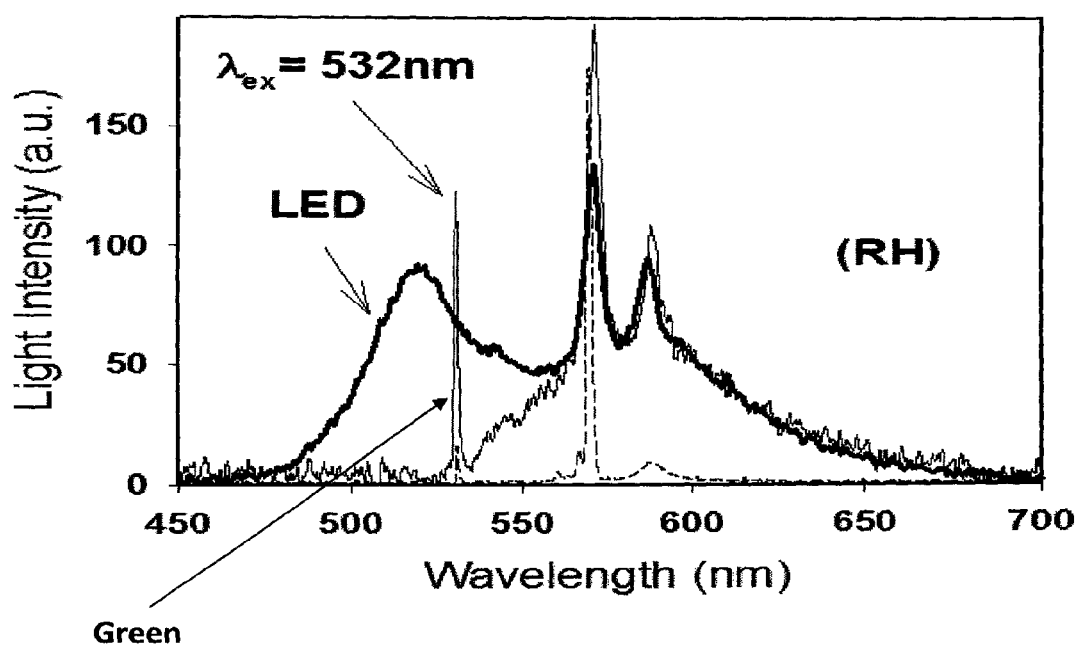
FIG. 5 is a graph diagram showing RH-emission of the LED pumped sample. For reference, a 532 CW laser line (green) as well as nanosecond laser emission (dashed) in the same sample are presented.

A relatively low lasing threshold of the pulsed and CW pumped laser emissions motivated us to attempt broad band CW optical pumping of the sample. Here, we used a commercially available, incoherent (FWHM ~25 nm), CW operated, 1 W green LED as the pumping source. An experimental setup similar to the CW laser pumped system was used. Pumping at an intensity of 5 W/cm2 by LED resulted in initial signs of lasing similar to that observed at 3 W/cm$^2$ pump levels of CW laser pumping. FIG. 5 plots the emission generated from the sample by LED excitation source (blue line). The emission at 572 nm exhibits strong directionality, identical peak emission wavelength, and bandwidth as the laser line observed in the same samples under CW laser excitation at 532 nm (shown for comparison). Furthermore, like the CW and nanosecond laser pumping, it occurs at the local minimum within the selective reflection band and with the polarization matching that of the CLC helix handedness. To date this is the first report of CW lasing with a broadband light source.

The emission of the sample will be temperature dependent and the directional emission will change wavelength as a function of temperature. Therefore, a temperature tuning of the emission can be obtained. Additional methods for tuning the emission include mechanical, electrical, or optical methods, as described in Blinov and R. Bartolino, eds. *Liquid Crystal Microlasers* (Transworld Research Network, 2010).), including, without limitation, by application of an uniform or non-uniform mechanical or electric field, by reversible or irreversible photo-optic tuning of the PBG material itself or by reversible or irreversible photo-optic tuning of the substrate(s) containing the PBG material(s)

While the present description has shown, described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims.

The invention claimed is:

1. A light emitting photonic band gab (PBG) material, comprising:
   (a) a polymer network exhibiting a non-uniform pitch;
   (b) a small molecule liquid crystal material with a birefringence>0.04;
   (c) one or more light emitting dyes, herein defined as any electrically or optically excitable material or dye that emits photons having a low triplet state absorption;
   wherein the non-uniform pitch of the polymer network comprises a uniform chirp, a non-uniform chirp, or a combination thereof;
   wherein the light emitting PBG material has a defect-induced density of states enhancing feature at a wavelength that overlaps the emission spectrum of the light emitting dye.

2. The light emitting material of claim 1, wherein excitation of the light emitting PBG material by a light source causes a directional electromagnetic emission from the light emitting material.

3. The light emitting material of claim 2, wherein the light source is selected from a group consisting of: a laser, a flash lamp, focused sunlight, a light-emitting diode (LED), an electrically pumped electroluminescent material embedded within the one or more light emitting material, and a continuous wave (CW) light source.

4. The light emitting material of claim 1, wherein the small molecule liquid crystal (LC) material is chosen from a chiral nematic liquid crystal, a nematic liquid crystal or a smectic liquid crystal.

5. The light emitting material of claim 1, wherein the polymeric network comprises a mesogenic monomer.

6. The light emitting material of claim 1, wherein the polymeric network comprises a chiral component.

7. The light emitting material of claim 1, wherein the light emitting dye is selected from a group consisting of: rare earth doped material, semiconductor materials, organic light-emitting materials, conjugated polymers, dye-doped material, materials containing color centers and fluorescent dyes.

8. The light emitting material of claim 1, wherein the light emitting dye emits light in the visible region of the spectrum.

9. The light emitting material of claim 2, wherein the directional electromagnetic emission form the light emitting material is a laser light.

10. The light emitting material of claim 9, wherein the directional electromagnetic emission form the light emitting material is a continuous wave laser light.

11. The light emitting material of claim 1, wherein the directional electromagnetic emission wavelength can be altered by one of: changing a temperature of the PBG material; applying mechanical stress; applying a uniform or non-uniform electric field; photo-optic tuning of the PBG material; or photo-optic tuning of one or more substrates containing the PBG material.

12. A light emitting device comprising a light emitting photonic band gap (PBG) material and a light source,
   wherein the PBG material comprises:
   (a) a polymer network exhibiting a uniform chirp, a non-uniform chirp, or a combination thereof;
   (b) a small molecule liquid crystal material with a birefringence >0.04
   (c) one or more light emitting dyes, herein defined as any electrically or optically excitable material or dye that emits photons having a low triplet state absorption;

wherein the light emitting PBG material has a defect-induced density of states enhancing feature at a wavelength that overlaps the emission spectrum of the light emitting dye, and wherein excitation of the light emitting PBG material by the light source causes a directional electromagnetic emission from the device.

13. The light emitting device of claim 12, wherein the light source is selected from a group consisting of: a laser, a flash lamp, focused sunlight, a light-emitting diode (LED), an electrically pumped electroluminescent material embedded within the one or more light emitting material, and a continuous wave (CW) light source.

14. The light emitting device of claim 12, wherein the PBG material comprises a polymer network exhibiting a non-uniform pitch, wherein the non-uniform pitch is either a uniform chirp, a non-uniform chirp, or a combination thereof.

15. The light emitting device of claim 14, wherein the polymeric network comprises a mesogenic monomer.

16. The light emitting device of claim 14, wherein the polymeric network comprises a chiral component.

17. The light emitting device of claim 12, wherein the PBG material comprises a small molecule LC material that is chosen from a chiral nematic liquid crystal, a nematic liquid crystal or a smectic liquid crystal.

18. The light emitting device of claim 12, wherein the PBG material comprises a light emitting fluorescent dye.

19. The light emitting device of claim 18, wherein the light emitting dye emits light in the visible region of the spectrum.

20. The light emitting device of claim 12, wherein the directional electromagnetic emission form the device is a laser light.

21. The light emitting device of claim 12, wherein the directional electromagnetic emission form the device is a continuous wave laser light.

22. The light emitting device of claim 12, wherein the directional electromagnetic emission has a wavelength that can be altered by one of: changing a temperature of the PBG material; applying mechanical stress; applying a uniform or nonuniform electric field; photo-optic tuning of the PBG material; or photo-optic tuning of one or more substrates containing the PBG material.

* * * * *